United States Patent Office 3,033,823
Patented May 8, 1962

3,033,823
RESINOUS COMPOSITIONS AND PROCESS
OF PREPARING SAME
Alex J. Malashevitz and Harry C. Merkt, Cincinnati, Ohio, assignors to Formica Corporation, Cincinnati, Ohio, a corporation of Delaware
No Drawing. Filed Nov. 12, 1957, Ser. No. 695,544
20 Claims. (Cl. 260—55)

This invention relates to a novel class of resinous material and to the process of preparing the same. More particularly, this invention relates to a novel class of resinous material prepared by reacting an aldehyde, an aldehyde-reactable resin-forming compound and a methylol aminomethane and to the process of preparing the same.

One of the objects of the present invention is to produce a novel class of resinous materials. A further object of the present invention is to produce a novel class of resinous materials prepared by reacting an aldehyde, an aldehyde-reactable resin-forming compound and a methylol aminomethane. A still further object of the present invention is to produce laminated articles using the novel resinous materials of the present invention. These and other objects of the present invention will be discussed in greater detail hereinbelow.

In the preparation of the resinous materials of the present invention, one may use any of the available aldehyde compounds such as formaldehyde, acetaldehyde, benzaldehyde, furfural, acrolein, butyraldehyde, pentaldehyde, heptaldehyde and the like. For most purposes, the formaldehyde is preferred because of its reactivity and economic availability.

The second component to be used in preparing the novel resinous compositions of the present invention are aldehyde-reactable resin-forming compounds and preferably those which have at least two aldehyde-reactive hydrogens in their molecule. Included in the group are the aminotriazines, the ureas, the phenols and the like. Among the aminotriazines which may be used advantageously are melamine, formoguanamine, acetoguanamine, benzoguanamine, ammeline, ammelide, and the like. Additional aminotriazines and aldehydes are recited in greater detail in the U.S. Patent No. 2,197,357. Although the resins of the present invention may be either alkylated or unalkylated, i.e., reacted with a compound containing an alcoholic hydroxy group of which a plurality are recited in the above-identified patent to Widmer and Fisch, for certain purposes the alkylated variety will be desired such as in the preparation of coating compositions wherein it is desired to react the aminotriazine aldehyde derivative with a monohydric alcohol such as methanol, ethanol, propanol and/or butanol. For other purposes such as in the manufacture of laminated articles, it is preferred that the unalkylated aminotriazine aldehyde resinous material be used. Of all of the aminotriazines available, melamine is preferred.

Among the urea compounds which may be used in the compositions of the present invention are urea per se, thiourea, methylene urea, ethylene urea, and the like. Among the ureas, the urea per se is preferred.

Among the phenols which may be used in the practice of the process of the present invention are phenol per se, resorcinol, cresol, ortho, meta, or para or mixtures thereof, xylenols, tertiary butyl catechol, tertiary butyl cresol, tertiary butyl hydroquinone, or the bisphenols such as bis-phenol A as disclosed in considerable detail in the U.S. Patent No. 2,506,486 and the like. For certain purposes, the phenol per se will be preferred while for other purposes the resorcinol will be preferred.

Among the methylol aminoethanes which may be used in the practice of the process of the present invention are a class of compounds represented by the following generic formula:

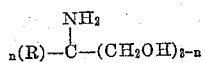

wherein $n$ is a whole number between 0 and 2, inclusive, and wherein R is methyl or ethyl. Among the compounds of this class which may be used in the practice of the present invention are tris-hydroxymethyl aminomethane, dihydroxymethyl aminomethyl methane, dihydroxymethyl aminoethyl methane, hydroxymethyl aminodimethyl methane, hydroxymethyl aminodiethyl methane, hydroxymethyl aminoethyl methyl methane, and the like. These methylol aminomethanes may be used either singly or in combination with one another.

In the preparation of the resinous materials of the present invention, the conventional mol ratio ranges of the prior art may be used with respect to the aldehyde to aldehyde-reactable resin-forming compound such as the formaldehyde to melamine, formaldehyde to urea and formaldehyde to phenol. For instance, one may use melamine to formaldehyde within the mol ratio of about 1:1 to about 1:6 and preferably between about 1:1.3 to about 1:3, respectively. For laminating resins, the melamine to formaldehyde ratio should be about 1:2. In the phenol-formaldehyde field, the mol ratio may be varied between about 1:0.5 to about 1:3, respectively. The resinous materials produced from the phenol-formaldehyde condensation products are outstandingly good for use in making snagging wheels because the resinous materials of the present invention are tough and capable of absorbing a considerable measure of shock. Still further, these phenolic resins may be used as rock wool binders and for the manufacture of insulation bats because the phenolic modified resins of the present invention are ashless. Still further, these phenolic resins of the present invention may be used in the manufacture of particle board and castings. The resorcinol-formaldehyde resins of the present invention are more reactive than the other species of this class and as a consequence, when the methylol aminomethane is introduced into the resorcinol-formaldehye reaction product, gelation takes place almost instantaneously making this type of resin outstandingly useful as an oil well cement or as a filler for cavities in subterranean passages such as in coal mines and in other subterranean excavations where it is desirable to use a resinous material which will set in situ almost instantaneously thereby reinforcing walls and ceilings and thereby diminishing the tendency for collapse of the surrounding materials into the excavated portion.

The urea type resins prepared according to the concept of the present invention may be prepared by reacting formaldehyde with urea in mol ratios varying between about 1:1 and 4:1, respectively. Preferably, this mol ratio is varied between about 1.5:1 and 2.5:1 formaldehyde to urea, respectively. The modified urea resins of the present invention will have application in a great plurality of directions such as in the manufacture of craze-resistant adhesives or in the manufacture of textile resins inasmuch as these urea resins will impart improved hand to the fabrics thus treated. These urea resins are desirable additionally because of the fact that they are extremely stable in a liquid form even at high solids content.

The amount of the methylol aminomethane used in the production of the resins of the present invention may be varied very substantially depending on the particular ultimate use to which the resin will be put such as amounts varying between about 0.1 mol of methylol aminomethane per mol of free available aldehyde to about 2 mols of methylol aminomethane per mol of free available aldehyde. For certain purposes, such as in the production of laminating resins, the amount of the methylol aminomethane must be more critically controlled. For instance, in the preparation of a melamine-formaldehyde resin for use in laminating surfaces, one should use between about 0.8 and 1.0 mol of tris-hydroxymethyl aminomethane per mol of calculated free formaldehyde present in the reaction system. Consideration must be given to the aldheyde affinity of the aldehyde-reactable resin-forming compound in determining the amount of the methylol aminomethane to be used if the addition of the methylol aminomethane is accomplished initially. If the addition of the methane derivative is accomplished after reaction of the aldehyde and the aldehyde-reactable resin-forming compound has been undertaken, the amount of free aldehyde available can be readily determined by analytical test. One of the better approaches is to react the aldehyde compound such as formaldehyde with the aldehyde-reactable resin-forming compound such as melamine for a comparatively brief period of time until the water tolerance of the resultant condensation product is between 500% and 1000%. This means that a sample of the resin produced can be diluted with five times its volume of water up to about ten times its volume of water without displaying any milkiness indicating the end point of water tolerance has been reached. At this point, it is desirable to introduce the tris-hydroxymethyl aminomethane and to carry out the reaction to the desired completion.

In order that the concept of the present invention may be more completely understood, the following examples are set forth in which all parts are parts by weight unless otherwise indicated. These examples are set forth primarily for the purpose of illustration and any specific enumeration of details contained therein should not be interpreted as a limitation on the case except as is indicated in the appended claims.

*Example 1*

Into a suitable reaction vessel equipped with thermometer, stirrer and reflux condenser, there is introduced 600 parts of urea, 1215 parts of a 37% aqueous solution of formaldehyde and 10 parts of triethanol amine. The charge is mixed at room temperature and the percentage of free formaldehyde is measured at regular intervals. The exothermic reaction which follows raises the temperature to about 43° C., but the free formaldehyde content is reduced to less than 9%. Thereupon, the batch is split into two equal portions. While continuing the mixing of the two samples, there is added 300 parts of tris-hydroxymethyl aminomethane to sample "B" whereas sample "A" was allowed to remain in its reaction vessel unmodified. The sample "A" solidified after 6 hours. In the same interval of time, the sample "B" remained a clear liquid. Sample "B" remained a clear liquid at 10° F. for two days. Sample "B" remained a clear liquid at 40° F. for five days. Sample "B" remained a clear liquid at 85° F. for more than sixty days. It can be seen from this that the addition of tris-hydroxymethyl aminomethane stabilized a typical "cream" resin and produced a clear solution outstandingly useful for the treatment of textile materials such as cotton, wool and the like.

*Example 2*

Example 1 was repeated in all details except that the mol ratio of urea to formaldehyde was altered from 1:1.5 to 1:1.1. The maximum exotherm was 35° C. and the tris-hydroxymethyl aminomethane was added when the percentage of free formaldehyde content was 6%. In this instance, however, only half of the amount of the tris-hydroxymethyl aminomethane was added that was needed to neutralize the free formaldehyde and this caused the solution to cream out overnight. This resin would, of course, have utility when immediate use is contemplated.

*Example 3*

Into a siutable reaction vessel equipped as before, there is introduced 600 parts of urea, 1220 parts of a 37% aqueous solution of formaldehyde, 685 parts of tris-hydroxymethyl aminomethane and 10 parts of triethanol amine and the mixture is stirred at room temperature, namely 27° C., to a peak exotherm of 34° C. A constant free formaldehyde value was obtained after about 2 hours and measured at 2.5%. The resultant resinous solution is still stable at room temperature and at 40° F. after thirty days.

*Example 4*

Example 3 is repeated in all details except that the triethanol amine is eliminated from the initial charge. The pH of the system was 7.2 as contrasted with a pH of 8.8 in Example 3 and the solids were 43.2% as contrasted with a solids content of 42.2 in Example 3. In both instances, the water tolerance was infinite.

*Example 5*

Example 3 is repeated in all details except that the charge is refluxed for about 30 minutes followed by the addition of 600 additional parts of the bis-trihydroxymethyl aminomethane followed by refluxing for an additional 30 minutes. The resultant solution is clear at room temperature and at 40° F. and shows an infinite water tolerance.

*Example 6*

Into a suitable reaction vessel equipped as before, there is introduced 600 parts of urea, 1630 parts of a 37% aqueous solution of formaldehyde and 5 parts of triethanol amine. The charge is heated to reflux at a pH of 8.2 and maintained at reflux for about 30 minutes. The pH of the system is adjusted to about 5.1–5.3 with formic acid and the system reacted to a water tolerance of 300%. The pH is adjusted to 8 with triethanol amine and the free formaldehyde percentage is determined and neutralized with 540 parts of tris-hydroxymethyl aminomethane.

*Example 7*

Example 6 is repeated in every detail except that the 540 parts of tris-hydroxymethyl aminomethane is introduced as an initial reactant. The pH is adjusted to 5.8 with formic acid. The mix becomes very milky.

*Example 8*

Example 6 is repeated in every detail except that the final adjustment of the pH to 8 was accomplished using sodium hydroxide in the place of triethanol amine.

*Example 9*

Into a suitable reaction vessel equipped as before, there is introduced 550 parts of resircinol, 270 parts of a 37% aqueous solution of formaldehyde, 150 parts of water, 150 parts of methanol and 10 parts of a 25% aqueous solution of sodium hydroxide. The charge is heated to reflux and maintained at that temperature for about 30 minutes whereupon the charge is cooled to room temperature. The pH is 6.0, the viscosity is 1300 centipoises measured at 25° C., the specific gravity is 1.137 and the percent of solids is 52. Separately, there is prepared a solution of 1200 parts of tris-hydroxymethyl aminomethane in 810 parts of a 37% aqueous solution of formaldehyde. To a sample of the resorcinol-formaldehyde resin thus prepared, there was added 30% of the tris-hydroxymethyl aminomethane solution in formaldehyde and gelation occurred within 1 minute at room temperature. In a separate sample the tris-hydroxymethyl aminomethane solution was reduced to but 5% and still rapid gelation was obtained.

*Example 10*

Example 9 is repeated in all details except that the caustic solution was eliminated and 240 parts of tris-hydroxymethyl aminomethane was added at the start of the reaction. Gelation occurred at the very start of refluxing.

*Example 11*

Into a suitable reaction vessel equipped as before, there is introduced 470 parts of phenol, 605 parts of a 37% aqueous solution of formaldehyde and 15 parts of a 28% aqueous solution of ammonia. The charge is heated to reflux and maintained at that temperature for 30 minutes. There is then added 300 parts of tris-hydroxymethyl aminomethane and the system is vacuum distilled to remove 495 parts of water. The resinous material is cooled to room temperature and on analysis has a pH of 7.7, a specific gravity of 1.189, a viscosity of 295 centipoises at 25° C., and a solids content of 66.2%.

*Example 12*

Example 11 is repeated in all details except that the ammonia solution charged was increased to 20 parts. The pH of the final cooled product was 8.3, the specific gravity 1.195, the viscosity 286 centipoises and the percent of solids 71.2%.

*Example 13*

Example 12 is repeated in all details except that the tris-hydroxymethyl aminomethane is introduced initially. The final cooled product had a pH of 8.3, the specific gravity of 1.176, a viscosity of 193 centipoises and a solids content of 47.8%.

*Example 14*

Into a suitable reaction vessel equipped as before, there is introduced 470 parts of phenol, 1015 parts of a 37% aqueous solution of formaldehyde and 30 parts of a 28% aqueous solution of ammonia. The charge is heated to reflux and refluxed for 30 minutes. Thereupon, there is added 25 parts of a 50% solution of lactic acid and 600 parts of tris-hydroxymethyl aminomethane. Substantially complete dehydration is accomplished by vacuum distilling until 865 parts of water are removed. The charge is cooled to room temperature. On analysis, the resin had a pH of 8.0 a specific gravity of 1.228, a viscosity of 1100 centipoises and a percent of solids of 81. Castings were produced from the above resin by curing in an oven at 80° C. for one day.

*Example 15*

Into a suitable reaction vessel equipped as before, there is introduced 470 parts of phenol, 1015 parts of a 37% aqueous solution of formaldehyde and 20 parts of a 25% aqueous solution of sodium hydroxide. The charge is heated with continuous stirring to reflux and maintained at that temperature for about 30 minutes. To the charge, there is added 600 parts of tris-hydroxymethyl aminomethane and the charge is then mixed for about 5 minutes. There is then added 25 parts of a 50% solution of lactic acid in water. The system is vacuum distilled to remove about 505 parts of water. On analysis, the resultant resinous syrup has a pH of 9.1, a specific gravity of 1.256, a viscosity of 1730 centipoises and a solids content of 75.2%. Castings were made from the resultant resinous material by curing in a closed container at 80° C. until they were hard. This took about five days and the castings produced were hard and clear.

*Example 16*

Example 15 was repeated but the vacuum distillation was continued until 767 parts of water were distilled from the system. The resultant resin was substantially fully dehydrated, and a casting cured at 80° C. for three days was hard, clear and free of defects.

*Example 17*

Into a suitable reaction vessel equipped as before, there is introduced 264 parts of melamine, 427.5 parts of a 30% aqueous solution of formaldehyde and 16.5 parts of triethanol amine. The charge is heated to about 90° C. and maintained at 90–95° C. to a water tolerance of 500%. There is then added 40 parts of tris-hydroxymethyl aminomethane and the system is cooled to about 70° C. whereupon 50 parts of isopropyl alcohol are added. The resultant resinous syrup had a pH of 9.3, a specific gravity of 1.238, a viscosity of 35 centipoises and a solids content of 52%. The free formaldehyde was measured at 0.3%. The resin varnish thus produced was used to impregnate an alpha-cellulose paper web which was combined with other core sheets in conventional fashion, and by the application of heat and pressure, a laminate was formed. The resultant laminate was vastly superior to those produced with standard laminating resins particularly with respect to their post-formability.

*Example 18*

Example 17 was repeated in every detail except that the tris-hydroxymethyl aminomethane was added after 15-minutes of heating at 90° C., a point of infinite water solubility. Alpha-cellulosic paper webs were impregnated in the conventional fashion with this syrup and a laminated article was prepared therefrom using the conventional support sheets impregnated with phenolic resin. Example 17 was repeated again to a point of water tolerance of 1000% whereupon the tris-hydroxymethyl aminomethane was added and again to a water tolerance of 300% at which point the tris-hydroxymethyl aminomethane was added. In each instance, the resins prepared were used to impregnate an alpha-cellulose web which was subsequently used in a conventional fashion to prepare a laminated structure. The post-forming properties decreased as the tris-hydroxymethyl aminomethane is added at a later and later time in the reaction. From this, it can be seen that chemical blocking of the melamine resin appears to be most effectively achieved by introducing the tris-hydroxymethyl aminomethane as early as possible in the reaction where post-formable properties are desired.

*Example 19*

Into a suitable reaction vessel equipped as before, there is introduced 365 parts of a 37% aqueous solution of formaldehyde, 284 parts of melamine and 0.5 part of triethyl amine. The charge is heated to about 90° C. and maintained at 90–95° C. until a water tolerance between about 1000% and 500% is reached. The resultant resinous syrup is tested for free formaldehyde content and there is added 1 mol of tris-hydroxymethyl aminomethane for each mol of free formaldehyde present and the resultant resin syrup is cooled to room temperature. Glass based melamine laminates prepared by impregnating woven glass fabric with the instant resin gave, on curing, a glass laminate having a flexural strength between 70,000 and 75,000 p.s.i. as contrasted with the flexural strength of conventional melamine resin glass based laminates having a flexural strength of 20,000–30,000 p.s.i.

*Example 20*

Into a suitable reaction vessel equipped as before, there is introduced 315 parts of melamine, 405 parts of a 37% aqueous solution of formaldehyde and 10 parts of triethanol amine. The charge is heated to reflux and maintained at reflux for about 5 minutes. Thereupon, there is added 300 parts of tris-hydroxymethyl aminomethane dissolved in 405 parts of a 37% aqueous solution of formaldehyde. The charge is reheated to reflux and maintained at that temperature for about 5 minutes which showed a water tolerance of about 200%. The system is vacuum dehydrated by removing about 550 parts of water. On analysis, the pH was 8.9, the specific gravity 1.325, and the solids content about 82%.

Example 21

Example 20 is repeated in every detail except that the amount of tris-hydroxymethyl aminomethane was doubled to 600 parts and was dissolved in 810 parts of a 37% aqueous solution of formaldehyde. On reheating to reflux, the reaction is maintained only to a water tolerance between 1,000 and 500%. Thereupon, the system is vacuum distilled by removing 775 parts of water. On analysis, the resinous syrup had a pH of 8.7, a specific gravity of 1.296, a viscosity of 710 centipoises and the solids were about 70%.

Example 22

Into a suitable reaction vessel equipped as before, there is introduced 315 parts of melamine and 405 parts of a 37% aqueous solution of formaldehyde. The charge is mixed for about 5 minutes whereupon there is added a solution of 600 parts of tris-hydroxymethyl aminomethane dissolved in 810 parts of a 37% aqueous solution of formaldehyde. The charge is heated to reflux and reacted to a water tolerance between about 1,000 and about 500%. The system is then vacuum distilled to remove about 965 parts of water. On analysis, the product had a pH of 7.6, a very high viscosity, and a solids content of about 83%. Castings produced from this resinous material when cured at 80° C. for three days were soft and rubbery. When cured at 60° C. for three days, the castings were still liquid and viscous.

It will be noted from the above examples that the process of the present invention may be carried out over a rather wide range of temperatures such as from about room temperature to about reflux. Ordinarily, for faster reaction times the temperature may be carried out at about reflux or within about 20–40 degrees thereof.

Most of these reactions are carried out on the alkaline side, namely, at any pH above 7 and preferably between 8 and 12.

In addition to using alpha-cellulose webs and glass fabrics as a material to be impregnated, other fillers may be used including chopped rag, silica, slate dust, asbestos fibers, individual glass fibers, regenerated cellulose, rayon, linen, kraft paper, and the like.

For molding and laminating purposes, it is sometimes desired to make use of a mold lubricant of which a plurality are well known in the art including zinc stearate, lead stearate, and other metallic salts of higher fatty acids.

In the production of laminates using the resinous materials of the present invention, an overlay sheet may be impregnated with the resins of the present invention, and a print sheet with a decorative design thereon may be impregnated with the resins of the present invention and combined with a plurality of conventional phenolic resin impregnated core sheets as is customary in the art.

For certain purposes, a curing catalyst may be desired in the use of the resins of the present invention whether the end use is molding, laminating, or adhesives in which event any of the well known acid catalysts may be used, some of which may be latent acid catalysts. In this connection, inorganic or organic acids may be used such as hydrochloric acid, acetic acid, phosphoric acid, sulfuric acid, paratoluene sulfonic acid, or any of the catalysts disclosed in the U.S. Patent 2,750,355.

Other modifiers may be used with the novel resins of the present invention for particular purposes such as the modifiers disclosed in the U.S. Patents 2,773,848 and 2,773,788.

One of the outstanding features of the melamine resin laminates prepared by using the novel resinous materials of the present invention is the post-formability of the resin laminate. These resin laminates may be deformed in a comparatively sharp arc having a radius as small as 1/16" without experiencing any crazing or cracking. Ordinarily, a laminate that will test for 3/4" radius in the arc on deformation is considered to be more than adequate for most purposes. Ordinary melamine-formaldehyde resin laminates will display crazing or cracking when post-formed by deformation to an arc having a radius of 1¼". Still further, the laminates prepared by using the resins of the present invention display improved buffing quality, wear resistance and the chemical resistance.

The point of addition of the methylol aminomethane may be varied from initial addition to any point in the course of the reaction but preferably not beyond a 100% water tolerance. For melamine resins, the water tolerance should be at least about 400%. If the methylol aminomethane is introduced initially or at an early stage in the reaction, no additional buffers are required.

In addition to the uses recited hereinabove, the resins of the present invention may be adapted for use in the treatment of paper, leather and textile materials. In the latter group are included the textile materials prepared from natural and synthetic fibers, whether woven or unwoven such as linear super polyamides, polyester fibers, wool, cotton, line, rayon and the like.

The water tolerance test as applied in the instant disclosure is one in which a sample of the resin syrup is taken from the reaction vessel, cooled to 25° C. and 10 cc. thereof is diluted with water at the same temperature until the first cloudiness appears. This is the approximate hydrophobe point. If this cloudiness is not dissipated by shaking and mixing of the water with the resin syrup, the amount of water used to reach that point is determined. If the amount is 10 cc., the water tolerance is 100%. If the amount of water added is 50 cc., the water tolerance is 500%. If the water added is 100 cc., the water tolerance is 1000%.

We claim:

1. A process for preparing a resinous material comprising reacting, under alkaline conditions, (1) at least one mol of a monoaldehyde per mol of (2) an aldehyde-reactable resin-forming compound, free of reactive aldehyde groups, selected from the group consisting of aminotriazines containing at least one amino group having at least one aldehyde-reactable hydrogen atom thereon, ureas having at least one aldehyde-reactable hydrogen atom, and phenols having at least one aldehyde-reactable hydrogen atom, wherein free available monoaldehyde is necessarily present in an amount over and above that which reacts with said aldehyde-reactable resin-forming compound, and (3) from about 0.1 mol to about 2 mols, per mol of said free available monoaldehyde, of a methylol aminomethane having the formula:

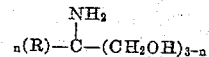

wherein $n$ is a number between 0 and 2, inclusive, and R is a member selected from the group consisting of methyl and ethyl, whereby said methylol aminomethane reacts with said free available monoaldehyde.

2. A process for preparing a resinous material comprising reacting, under alkaline conditions, (1) at least one mol of formaldehyde per mol of (2) an aldehyde-reactable resin-forming compound, free of reactive aldehyde groups, selected from the group consisting of aminotriazines containing at least one amino group having at least one aldehyde-reactable hydrogen atom thereon, ureas having at least one aldehyde-reactable hydrogen atom, and phenols having at least one aldehyde-reactable hydrogen atom, wherein free available formaldehyde is necessarily present in an amount over and above that which reacts with said aldehyde-reactable resin-forming compound, and (3) from about 0.1 mol to about 2 mols, per mol of said free available formaldehyde, of a methylol aminomethane having the formula:

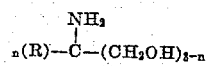

wherein $n$ is a number between 0 and 2, inclusive, and R is a member selected from the group consisting of methyl and ethyl, whereby said methylol aminomethane reacts with said free available formaldehyde.

3. A process for preparing a resinous material comprising reacting, under alkaline conditions, (1) at least one mol of formaldehyde per mol of (2) an aminotriazine containing at least one amino group having at least one aldehyde-reactable hydrogen atom thereon, wherein free available formaldehyde is necessarily present in an amount over and above that which reacts with said aminotriazine, and (3) from about 0.1 mol to about 2 mols, per mol of said free available formaldehyde, of a methylol aminomethane having the formula:

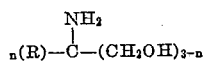

wherein $n$ is a number between 0 and 2, inclusive, and R is a member selected from the group consisting of methyl and ethyl, whereby said methylol aminomethane reacts with said free available formaldehyde.

4. A process for preparing a resinous material comprising reacting, under alkaline conditions, (1) at least one mol of formaldehyde per mol of (2) melamine, wherein free available formaldehyde is necessarily present in an amount over and above that which reacts with said melamine, and (3) from about 0.1 mol to about 2 mols, per mol of said free available formaldehyde, of a methylol aminomethane having the formula:

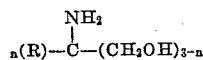

wherein $n$ is a number between 0 and 2, inclusive, and R is a member selected from the group consisting of methyl and ethyl, whereby said methylol aminomethane reacts with said free available formaldehyde.

5. A process for preparing a resinous material comprising reacting, under alkaline conditions, (1) at least one mol of formaldehyde per mol of (2) melamine, wherein free available formaldehyde is necessarily present in an amount over and above that which reacts with said melamine, and (3) from about 0.1 mol to about 2 mols, per mol of said free available formaldehyde, of tris-hydroxymethyl aminomethane, whereby said tris-hydroxymethyl aminomethane reacts with said free available formaldehyde.

6. A process for preparing a resinous material comprising reacting, under alkaline conditions, (1) at least one mol of formaldehyde per mol of (2) a urea having at least one aldehyde-reactable hydrogen atom, wherein free available formaldehyde is necessarily present in an amount over and above that which reacts with said urea, and (3) from about 0.1 mol to about 2 mols, per mol of said free available formaldehyde, of a methylol aminoethane having the formula:

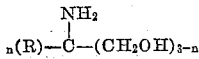

wherein $n$ is a number between 0 and 2, inclusive, and R is a member selected from the group consisting of methyl and ethyl, whereby said methylol aminomethane reacts with said free available formaldehyde.

7. A process for preparing a resinous material comprising reacting, under alkaline conditions, (1) at least one mol of formaldehyde per mol of (2) urea, wherein free available formaldehyde is necessarily present in an amount over and above that which reacts with said urea, and (3) from about 0.1 mol to about 2 mols, per mol of said free available formaldehyde, of a methylol aminomethane having the formula:

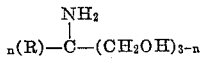

wherein $n$ is a number between 0 and 2, inclusive, and R is a member selected from the group consisting of methyl and ethyl, whereby said methylol aminomethane reacts with said free available formaldehyde.

8. A process for preparing a resinous material comprising reacting, under alkaline conditions, (1) at least one mol of formaldehyde per mol of (2) urea, wherein free available formaldehyde is necessarily present in an amount over and above that which reacts with said urea, and (3) from about 0.1 mol to about 2 mols, per mol of said free available formaldehyde, of tris-hydroxymethyl aminomethane, whereby said tris-hydroxymethyl aminomethane reacts with said free available formaldehyde.

9. A process for preparing a resinous material comprising reacting, under alkaline conditions, (1) at least one mol of formaldehyde per mol of (2) a phenol free of reactive aldehyde groups and having at least one aldehyde-reactable hydrogen atom, wherein free available formaldehyde is necessarily present in an amount over and above that which reacts with said phenol, and (3) from about 0.1 mol to about 2 mols, per mol of said free available formaldehyde, of a methylol aminomethane having the formula:

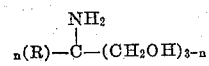

wherein $n$ is a number between 0 and 2, inclusive, and R is a member selected from the group consisting of methyl and ethyl, whereby said methylol aminomethane reacts with said free available formaldehyde.

10. A process for preparing a resinous material comprising reacting, under alkaline conditions, (1) at least one mol of formaldehyde per mol of (2) phenol, wherein free available formaldehyde is necessarily present in an amount over and above that which reacts with said phenol, and (3) from about 0.1 mol to about 2 mols, per mol of said free available formaldehyde, of a methylol aminomethane having the formula:

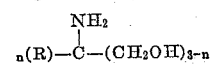

wherein $n$ is a number between 0 and 2, inclusive, and R is a member selected from the group consisting of methyl and ethyl, whereby said methylol aminomethane reacts with said free available formaldehyde.

11. A process for preparing a resinous material comprising reacting, under alkaline conditions, (1) at least one mol of formaldehyde per mol of (2) resorcinol, wherein free available formaldehyde is necessarily present in an amount over and above that which reacts with said resorcinol, and (3) from about 0.1 mol to about 2 mols, per mol of said free available formaldehyde, of a methylol aminomethane having the formula:

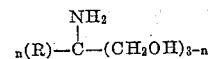

wherein $n$ is a number between 0 and 2, inclusive, and R is a member selected from the group consisting of methyl and ethyl, whereby said methylol aminomethane reacts with said free available formaldehyde.

12. A process for preparing a resinous material comprising reacting, under alkaline conditions, (1) at least one mol of formaldehyde per mol of (2) phenol, wherein free available formaldehyde is necessarily present in an amount over and above that which reacts with said phenol, and (3) from about 0.1 mol to about 2 mols, per mol of said free available formaldehyde, of tris-hydroxymethyl aminomethane, whereby said tris-hydroxymethyl aminomethane reacts with said free available formaldehyde.

13. A process for preparing a resinous material comprising reacting, under alkaline conditions, (1) at least one mol of formaldehyde per mol of (2) resorcinol, wherein free available formaldehyde is necessarily present in an amount over and above that which reacts with said resorcinol, and (3) from about 0.1 mol to about 2 mols, per mol of said free available formaldehyde, of tris-hydroxymethyl aminomethane, whereby said tris-hydroxymethyl aminomethane reacts with said free available formaldehyde.

14. The resinous reaction product, prepared under alkaline conditions, of (1) at least one mol of a monoaldehyde per mol of (2) an aldehyde-reactable resin-forming compound, free of reactive aldehyde groups, selected from the group consisting of aminotriazines containing at least one amino group having at least one aldehyde-reactable hydrogen atom thereon, ureas having at least one aldehyde-reactable hydrogen atom, and phenols having at least one aldehyde-reactable hydrogen atom, wherein free available monoaldehyde is necessarily present during the preparation of said reaction product in an amount over and above that which reacts with said aldehyde-reactable resin-forming compounds, and (3) from about 0.1 mol to about 2 mols, per mol of said free available monoaldehyde, of a methylol aminomethane having the formula:

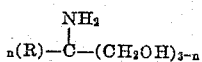

wherein $n$ is a number between 0 and 2, inclusive, and R is a member selected from the group consisting of methyl and ethyl, said methylol aminomethane having reacted with said free available monoaldehyde.

15. The resinous reaction product, prepared under alkaline conditions, of (1) at least one mol of formaldehyde per mol of (2) an aminotriazine containing at least one amino group having at least one aldehyde-reactable hydrogen atom thereon, wherein free available formaldehyde is necessarily present during the preparation of said reaction product in an amount over and above that which reacts with said aminotriazine, and (3) from about 0.1 mol to about 2 mols, per mol of said free available formaldehyde, of a methylol aminomethane having the formula:

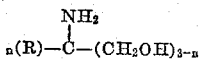

wherein $n$ is a number between 0 and 2, inclusive, and R is a member selected from the group consisting of methyl and ethyl, said methylol aminomethane having reacted with said free available formaldehyde.

16. The resinous reaction product, prepared under alkaline conditions, of (1) at least one mol of formaldehyde per mol of (2) melamine, wherein free available formaldehyde is necessarily present during the preparation of said reaction product in an amount over and above that which reacts with said melamine, and (3) from about 0.1 mol to about 2 mols, per mol of said free available formaldehyde, of tris-hydroxymethyl aminomethane, said tris-hydroxymethyl aminomethane having reacted with said free available formaldehyde.

17. The resinous reaction product, prepared under alkaline conditions, of (1) at least one mol of formaldehyde per mol of (2) urea, wherein free available formaldehyde is necessarily present during the preparation of said reaction product in an amount over and above that which reacts with said urea, and (3) from about 0.1 mol to about 2 mols, per mol of said free available formaldehyde, of tris-hydroxymethyl aminomethane, said tris-hydroxymethyl aminomethane having reacted with said free available formaldehyde.

18. The resinous reaction product, prepared under alkaline conditions, of (1) at least one mol of formaldehyde per mol of (2) resorcinol, wherein free available formaldehyde is necessarily present during the preparation of said reaction product in an amount over and above that which reacts with said resorcinol, and (3) from about 0.1 mol to about 2 mols, per mol of said free available formaldehyde, of tris-hydroxymethyl aminomethane, said tris-hydroxymethyl aminomethane having reacted with said free available formaldehyde.

19. A laminated article containing in its surface layer a thermoset resin which, in its uncured state, comprises a curable resinous reaction product, prepared under alkaline conditions, of (1) at least one mol of formaldehyde per mol of (2) melamine, wherein free available formaldehyde is necessarily present during the preparation of said reaction product in an amount over and above that which reacts with said melamine, and (3) from about 0.1 mol to about 2 mols, per mol of said free available formaldehyde, of a methylol aminomethane having the formula:

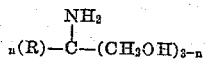

wherein $n$ is a number between 0 and 2, inclusive, and R is a member selected from the group consisting of methyl and ethyl, said methylol aminomethane having reacted with said free available formaldehyde.

20. A laminated article containing in its surface layer a thermoset resin which, in its uncured state, comprises a curable resinous reaction product, prepared under alkaline conditions, of (1) at least one mol of formaldehyde per mol of (2) melamine, wherein free available formaldehyde is necessarily present during the preparation of said reaction product in an amount over and above that which reacts with said melamine, and (3) from about 0.1 mol to about 2 mols, per mol of said free available formaldehyde, of tris-hydroxymethyl aminomethane, said tris-hydroxymethyl aminomethane having reacted with said free available formaldehyde.

References Cited in the file of this patent

UNITED STATES PATENTS

| | | |
|---|---|---|
| 2,215,038 | Hodgins et al. | Sept. 17, 1940 |
| 2,366,129 | Rust | Dec. 26, 1944 |
| 2,374,077 | Burke | Apr. 17, 1945 |
| 2,426,128 | Trowell | Aug. 19, 1947 |
| 2,466,744 | Scott | Apr. 12, 1949 |
| 2,471,188 | Auten | May 24, 1949 |
| 2,561,973 | Cohen | July 24, 1951 |
| 2,641,584 | Martone | June 9, 1953 |
| 2,917,411 | Kress | Dec. 15, 1959 |

UNITED STATES PATENT OFFICE

CERTIFICATE OF CORRECTION

Patent No. 3,033,823　　　　　　　　　　　　　　　　　May 8, 1962

Alex J. Malashevitz et al.

It is hereby certified that error appears in the above numbered patent requiring correction and that the said Letters Patent should read as corrected below.

Column 4, line 24, for "bis-trihydroxy-" read -- tris-hydroxy- --; column 6, line 59, for "20,000-30,000 p.s.i." read -- 25,000-30,000 p.s.i. --; column 7, line 71, after "radius" insert -- of --; column 8, line 19, for "line" read -- linen --; column 9, line 11, for "mehhylol" read -- methylol --.

Signed and sealed this 3rd day of December 1963.

(SEAL)　　　　　　　　　　　　　　　　　　　　EDWIN L. REYNOLDS
Attest:
ERNEST W. SWIDER
　　　　　　　　　　　　　　　　　　　　　　Acting Commissioner of Patents
Attesting Officer